United States Patent [19]

Gunther

[11] Patent Number: 5,220,154
[45] Date of Patent: Jun. 15, 1993

[54] HOT RUNNER SYSTEM

[75] Inventor: Herbert Gunther, Allendorf, Fed. Rep. of Germany

[73] Assignee: Herbert Gunther Gesellschaft MBH, Perchtoldsdorf, Austria

[21] Appl. No.: 663,464

[22] Filed: Mar. 4, 1991

[30] Foreign Application Priority Data

Mar. 3, 1990 [EP] European Pat. Off. ............ 90104169

[51] Int. Cl.⁵ ............................ H05B 3/44; B29B 7/00
[52] U.S. Cl. ...................................... 219/421; 219/544;
219/424; 425/549; 425/DIG. 13; 264/328.14
[58] Field of Search ............... 219/523, 530, 421, 541,
219/544, 420, 422, 423, 424; 425/549, 548,
DIG. 13, 547, 564, 566, 570; 264/328.14,
328.15, 328.16

[56] References Cited

U.S. PATENT DOCUMENTS

| | | | |
|---|---|---|---|
| 3,677,682 | 7/1972 | Putkowski | 425/548 |
| 3,812,228 | 5/1974 | Skoroszewski | 264/54 |
| 4,395,222 | 7/1983 | Gaiser et al. | 425/548 |
| 4,770,623 | 9/1988 | Gutjahr | 425/207 |
| 4,856,979 | 8/1989 | Schreck | 425/547 |

FOREIGN PATENT DOCUMENTS

| | | |
|---|---|---|
| 0274005 | 3/1985 | European Pat. Off. . |
| 0194460 | 9/1986 | European Pat. Off. ............ 425/547 |
| 2552704 | 9/1984 | France . |
| 3239022 | 10/1988 | Japan ............................ 425/547 |

Primary Examiner—Bruce A. Reynolds
Assistant Examiner—Michael D. Switzer
Attorney, Agent, or Firm—Fred Philpitt

[57] ABSTRACT

In a hot runner system for injection molding, a runner block (10) has a bore (14) in a casing (12) for facewise insertion of a heatable cartridge (16) comprising a core member (30) with an inside runner (34). A flow tube (32) having flow passages (35, 36) at its face ends and/or at its periphery carries an electrically insulated (39) heating coil (38) overcast with a thermoconductive mass (V) containing aluminium. Abutting members (18) seal the runner block (10) axially. Spaced radial supports (40, 49, 69) project over the outer diameter (D) of the core member (30), hollows or recesses (41, 44) serving for minimum heat transfer at the bearing area. An outer sleeve body (20) of the flow tube (32) may have sections (21 to 24) with a recessed central portion (46) sealingly engaging a collar-type support (40). Narrow peripheral ribs (42, 50) axially separate ring pockets (41) and outer compartments or spaces (52). Overlaps (26) at joining gaps (25) of the sleeve sections (21 to 24) are self-closing under operational pressure. Annular chambers (54) at the cartridge outside remain free of plastics.

19 Claims, 7 Drawing Sheets

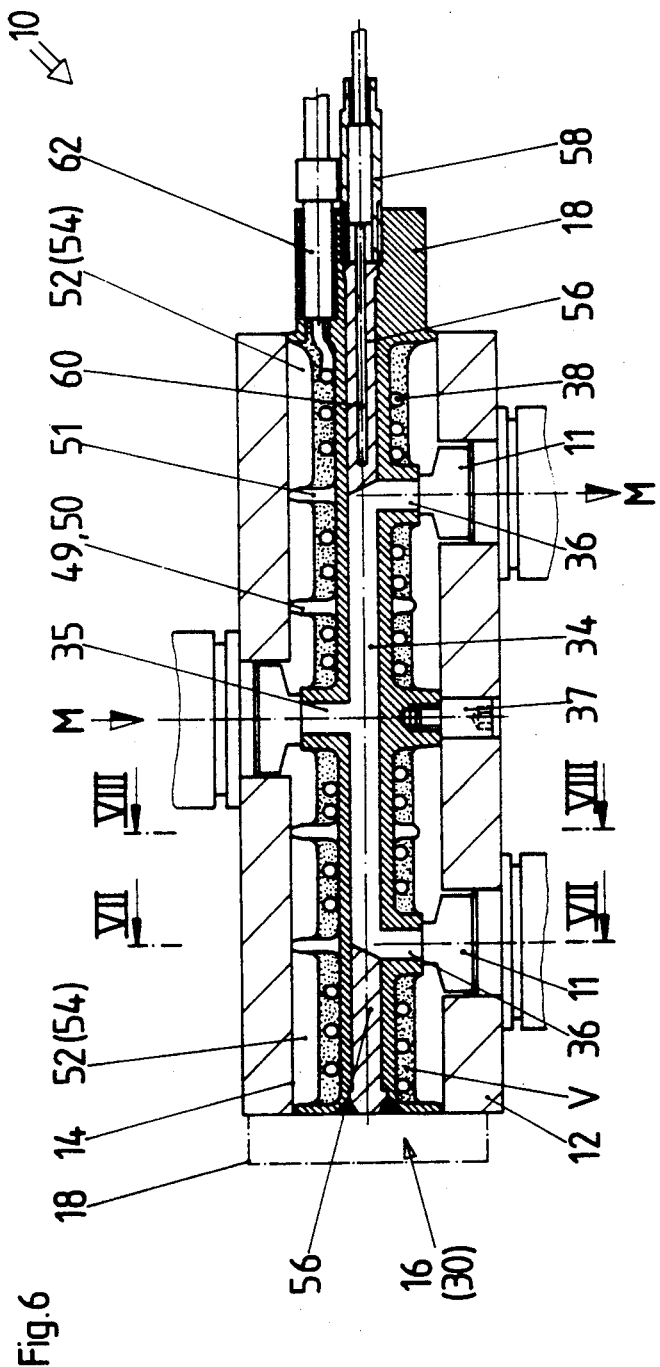
Fig.6
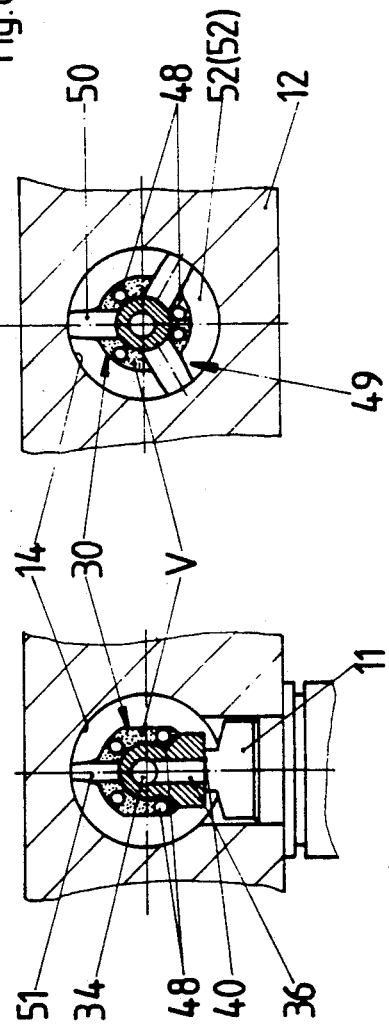
Fig.7
Fig.8

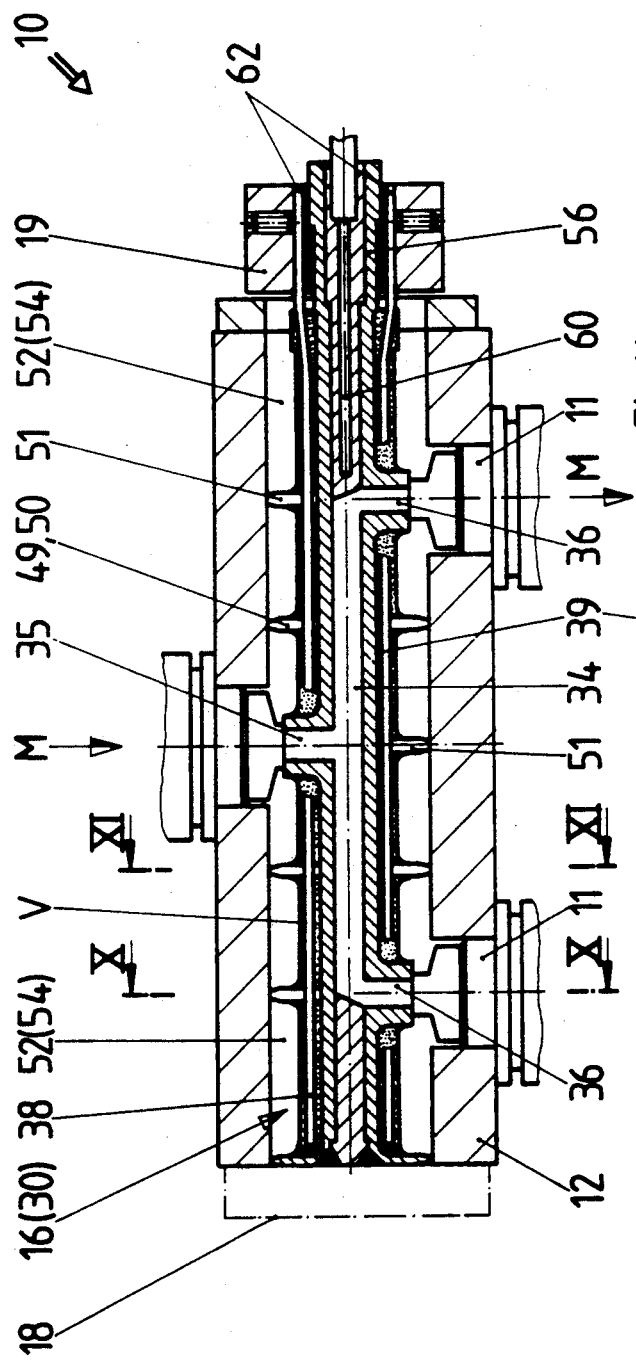
Fig. 9
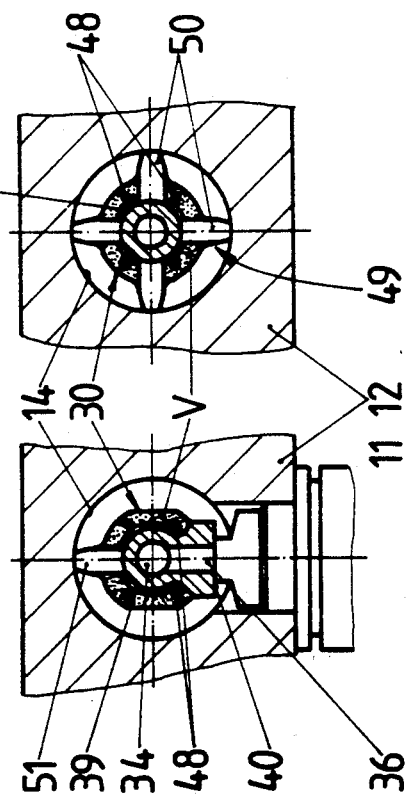
Fig. 11
Fig. 10

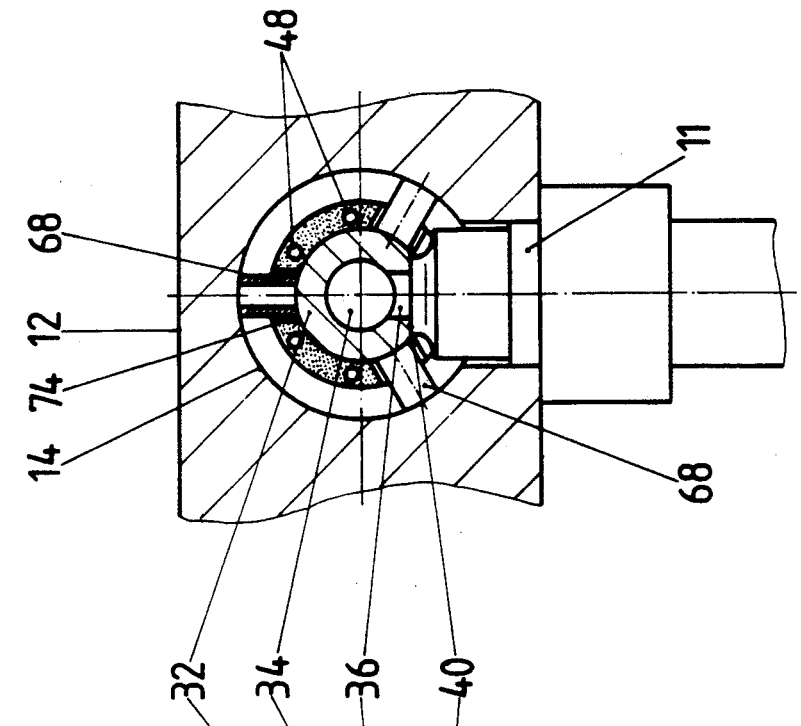
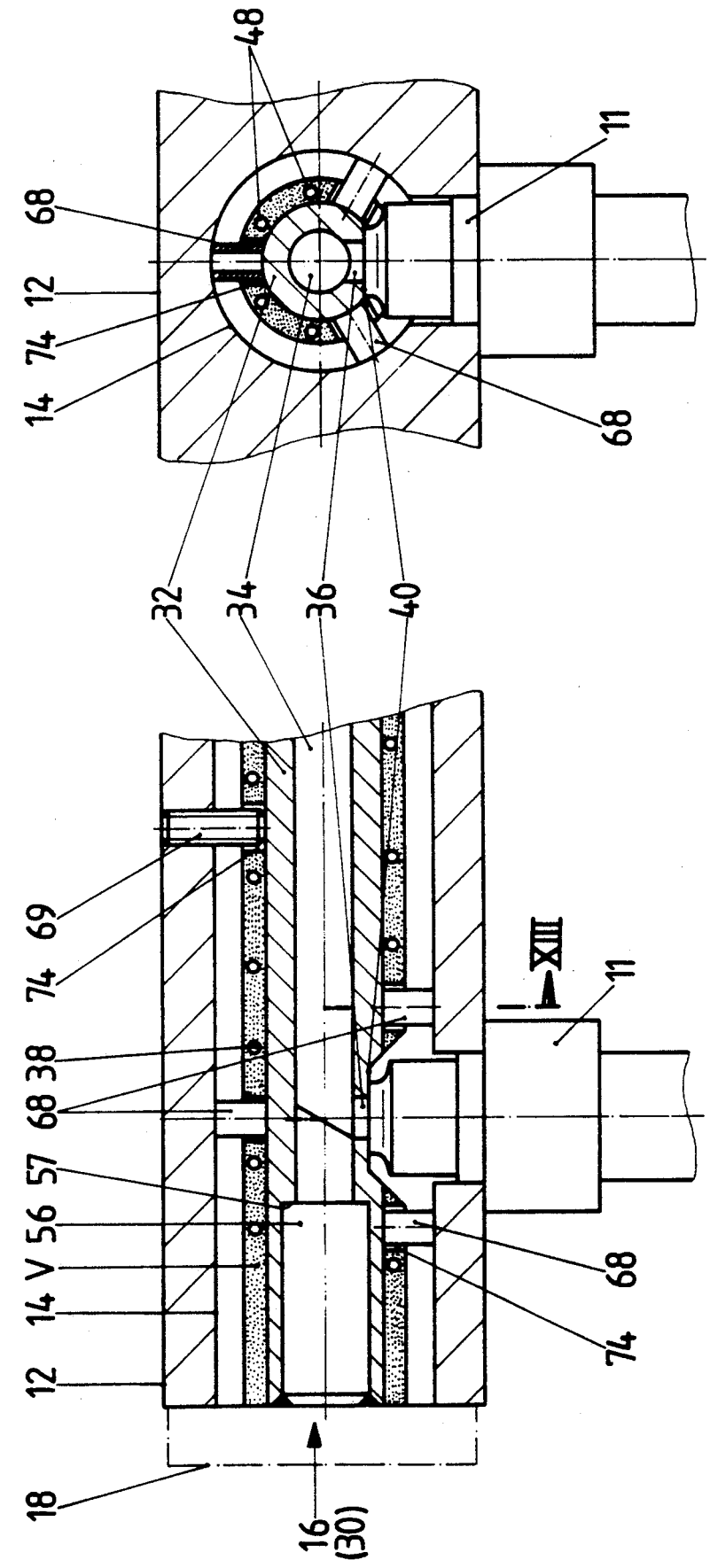

HOT RUNNER SYSTEM

FIELD OF THE INVENTION

The invention relates to a hot runner system according to the generic part of claim 1, to be utilized in plants for injection molding of plastics.

PRIOR ART

Conventional runners of this general type comprise blocks that are partially heated by built-in cartridge-type heaters or by tubular heating systems. Frequently the thermal isolation relative to an adjacent injection molding unit is imperfect. Since warming-up of the block requires much heat, long heating-up times cannot be avoided. Cleaning may also be difficult, especially with internal heating devices.

A runner system such as disclosed in U.S. Pat. No. 3,091,812 is arranged to an adjacent block in which a conductive T-shaped tube encloses an insulating material wherein a metal tube is embedded for conveying a flow of plastics under external or self-produced heating. The ends of the T-shaped tube are welded to steel plates that lack insulation vis-à-vis the flow tube whereby in use large heat dissipation will occur, resulting in considerable loss of energy. There will also be an indeterminate influence on the temperature of the mold. Cleaning of the unit is hardly possible, except at works under extreme expenditures for complicated mechanical and chemical processes. In cases of full maintenance, the user is compelled to acquire a new unit.

Much the same holds for a hot runner system according to U.S. Pat. No. 3,520,026 describing a runner block which is heated throughout either by thermal bridging or as a self-heating unit. Temperature is bound to decrease sharply at points where the flow of plastics passes to the mold. Owing to high processing pressure, large forces will occur which must be ramified around the block. This leads to a rather complex design.

A hot runner block according to DE-A1-3 710 139 includes a longitudinal bore for receiving an insert that is grooved so as to carry heating coils. In a direction transverse to the longitudinal bore, there are bores which hold so-called nodal components serving to compensate for heat expansion in the internal tube region. An extremely accurate hot sealing system is inevitable for safe function, entailing large expenditures.

In EP-A2-0 274 005, there is disclosed a hot runner system having a flow tube which, together with heating means and an encompassing sleeve, forms an independent unit designed for mounting into or out of a casing face. One or more thermal shells or stages of insulation are provided between said unit and the casing. The heating means may include a resistor tube of specific geometry or a high voltage coil, say for 220 volts, in order to increase the heat dissipation at points where the flow of plastics passes to the next section, whereas the in-between regions of the inner flow tube are less heated. Outer insulating spaces towards the casing are filled with solidified plastics during operation. The sleeve comprises air gaps below supporting rings so as the further enhance thermal insulation.

OBJECTS OF THE INVENTION

It is an object of the invention to improve hot runner systems of the type mentioned last so that better mechanical and thermal properties are obtained in a simple and economical manner.

Another objective is to provide a novel hot runner system warranting a maximum of electrical safety as well as a minimum of heat losses towards the casing.

Yet another object of the invention is the reduction of operational expenditure in terms of both time and energy, without sacrificing ease of assembly, of maintenance and of cleaning the hot runner system.

SUMMARY OF THE INVENTION

Important features of the invention are stated in claims 1 and 15. Further design embodiments are specified in claims 2 through 14 and claims 16 through 25.

A hot runner system according to the invention is distinguished by integral cartridges designed for easy facewise insertion into a bore of a runner block casing, wherein heating means are electrically insulated relative to a flow tube and are thermoconductively bonded to it so as to form a solid core member. More particularly, a heating coil of constant or variable pitch may be overcast with a thermoconductive compound mass containing aluminium, and the cartridge, especially the flow tube proper, may comprise a plurality of axially spaced radial supports that project radially over the outer diameter of the core member for close fit inside the casing bore.

Preferred embodiments of the invention include radial supports of the flow tube located at flow passages and shaped for direct sealing engagement of further hot runner components, e.g. nozzles and/or additional cartridges or flow tubes. Radial supports extending parallel to an axial direction may be arranged opposite collar-type supports for transmission of large flow reaction forces. Advantageously, collar-type supports comprise sealing faces arranged inside the runner block bore without contact thereto, and they may include outer channels for receiving longitudinal portions of the heating means in the regions of the flow passages.

Very expedient is a structure wherein the radial supports of the cartridge are thermally insulated from its thermoconductive portions, especially from the compound mass. Much energy is saved if the radial supports are designed for minimum heat transfer at the bearing areas in the bore, e.g. by recesses, hollows, ring pockets, etc. Axially spaced narrow spiders shaped as stars with at least three spokes will ensure sufficient engagement of the bore wall but will restrict heat dissipation from the interior. The radial supports may include a hub portion rigidly connected to the flow tube, e.g. by welding or brazing, or they may be studs attached to the flow tube, e.g. by screwing. For optimum thermal insulation, the cartridge may include outer peripheral ribs snug-fitted in the bore so that outer hollow compartments spaced are separated in an axial direction.

Another important feature of the invention provides a sleeve body which is part of an cartridge-like assembly facewise inserted into the casing. It may include a plurality of sleeve sections each of which is permanently attached to a collar-shaped radial support element arranged in the region of a flow passage. As a result, a very stable compound body is formed the interior of which cannot be reached by the plastics material processed, since the outer sleeve body is a closed structure throughout its length. Therefore, this defines an insulated volume irrespective of the size or length of the runner proper, whereby the heat developed in the interior is essentially passed on to the plastics material and only minor heat dissipation outwardly can take place at some small bearing areas of radial support elements.

The stability of the structure is much increased if each sleeve body section includes a radially recessed central portion shrunk or welded onto an associated collar-type support. Also, the expenditures for manufacture are greatly reduced thereby, compared to conventional hot runner systems.

Both design advantages and savings of operational energy consumption are achieved by peripheral recesses and/or outer channels in each collar-type support. Thus longitudinal bridge portion of the heating means can be easily accommodated. A matrix of aluminium or an alluminium alloy is preferably used to embed the heating means in order to form a solid core member over whose outer diameter radial supports project to form a solid core member over whose outer diameter radial supports project. Heat-insulating spaces may be between the core member and the sleeve body. Contrary to the prior art systems which included ill-defined dissipating bridges and, therefore, suffered uncontrolled heat losses, the invention thus permits reproducibly little heat transition merely at a few narrow supporting elements between the flow tube and the casing bore.

Great advantages are achieved if, in accordance with another important feature of the invention, the sleeve sections are interconnected by overlaps at joining gaps that are sealed against flow of plastics by partitions, especially if operational pressure acting in outer spaces or compartments between peripheral ribs renders the overlaps self-closing. In case plastics material should, under extremely unfavorable conditions, penetrate into the outer spaces after all, the high processing pressure will forcefully bear onto the outer overlap so as to press it onto the inner overlap for perfect sealing. Intermediate sleeve sections may compensate for thermal expansion or shrinking as the temperature conditions change during operation.

At least one annular chamber at an end of the core member may axially extend into an empty space with also reduces heat conduction towards the casing. Great stability on the one hand and easy access for connections as well as cleaning are achieved by positively fitting the ends of the sleeve body to abutting members which axially seal the runner casing. A thermosensor may extend into the region of a collar-type support, in particular inside a plug at the face end of the cartridge, so that the heating means is controlled by the actual temperature of the interior near the main runner.

An admission opening such as the flow entrance may be arranged radially at the cartridge, which is expedient for straight structures, or it may replace a deflecting plug and be arranged axially, i.e. at a face end of the cartridge, which is preferred for angular or curved runners.

H-shaped or cross-type runners are formed according to the invention by at least two cartridge units inserted into casing bores at an angle to each other such that a face end of a flow tube sealingly engages a tubular recess of a sleeve section provided with a collar-type support. Therefore, the casing bores may intersect each other, which in turn facilitates and stabilizes the fixing of the units inserted. Securing pins may be used for the purpose, and the flow tubes may be facewise supported relative to each transverse cartridge, e.g. by end portions of shrunk sleeve sections.

Further features, details and advantages of the invention will become apparent from the claims as well as the following description of preferred embodiments shown in the annexed drawings wherein:

Figure 1:
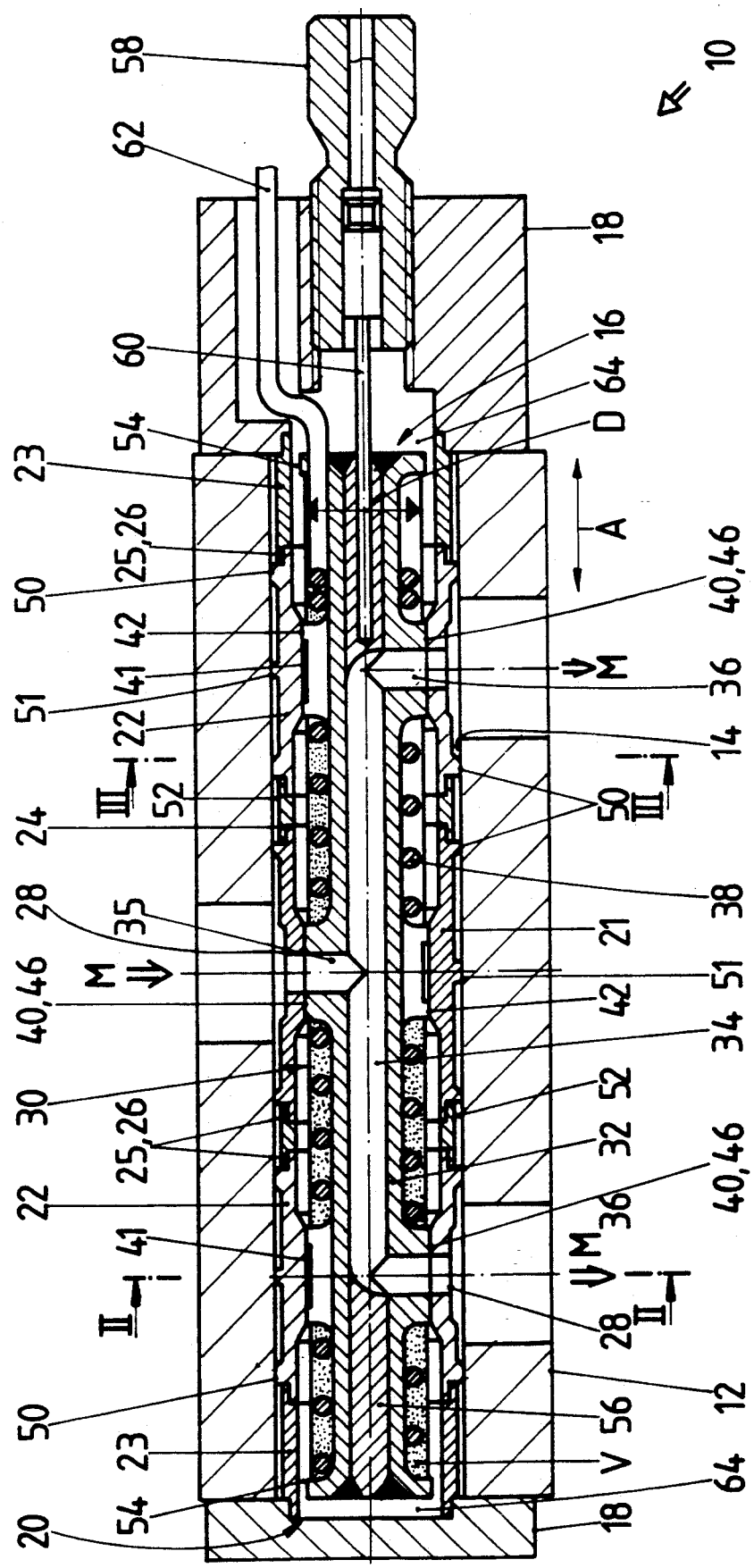
FIG. 1 is an axial sectional view of a hot runner.
Figure 3:
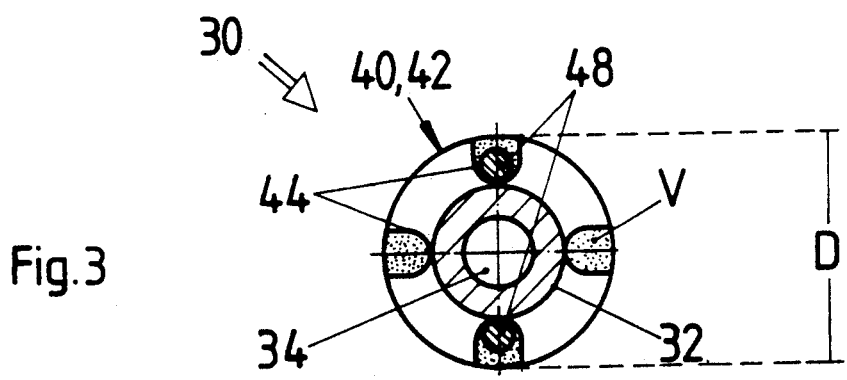
Figure 5:
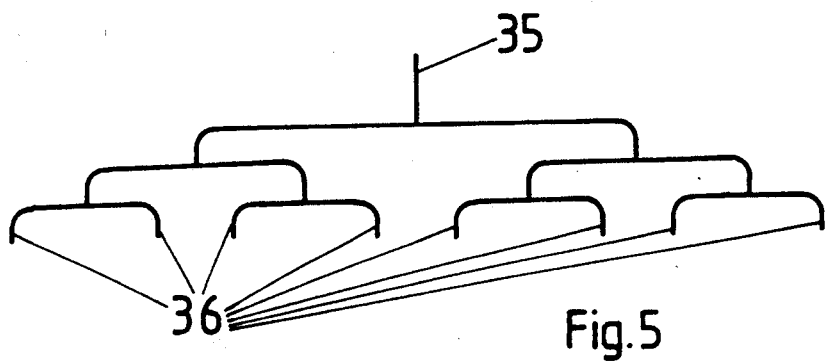
Figure 4:
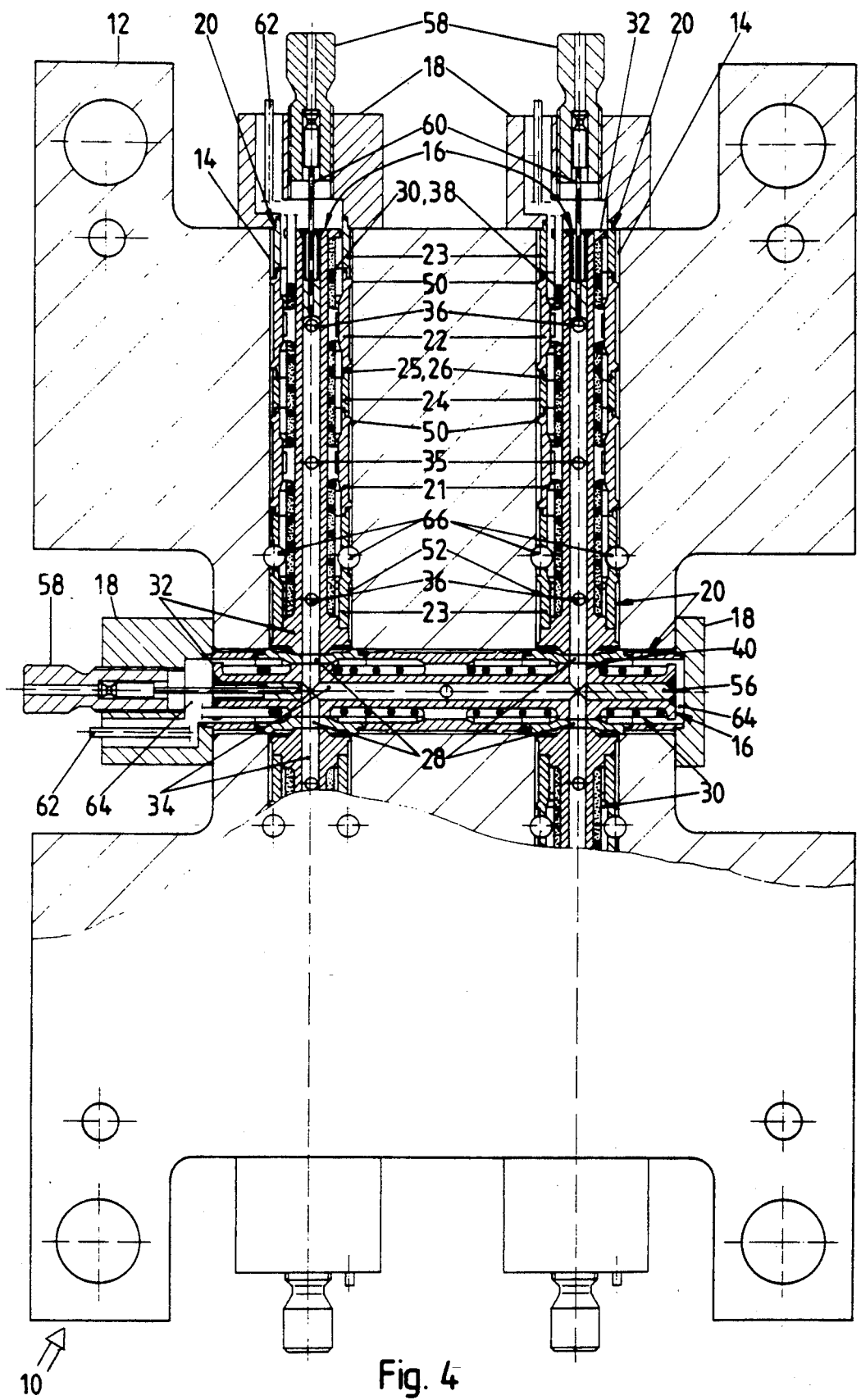
Figure 15:
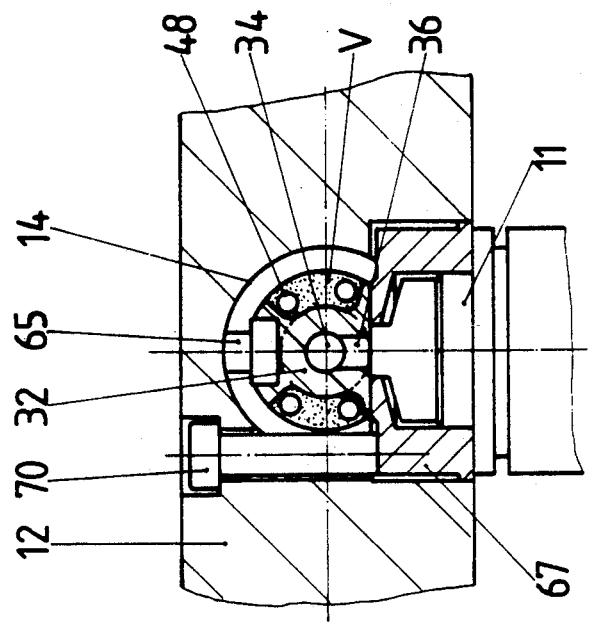
Figure 16:
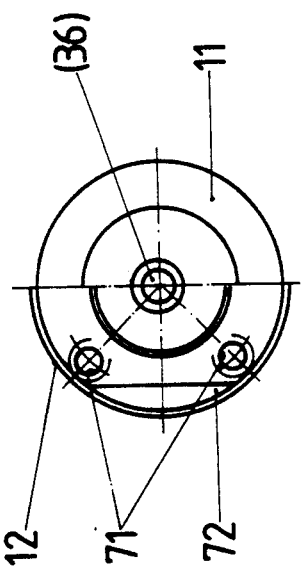
Figure 14:
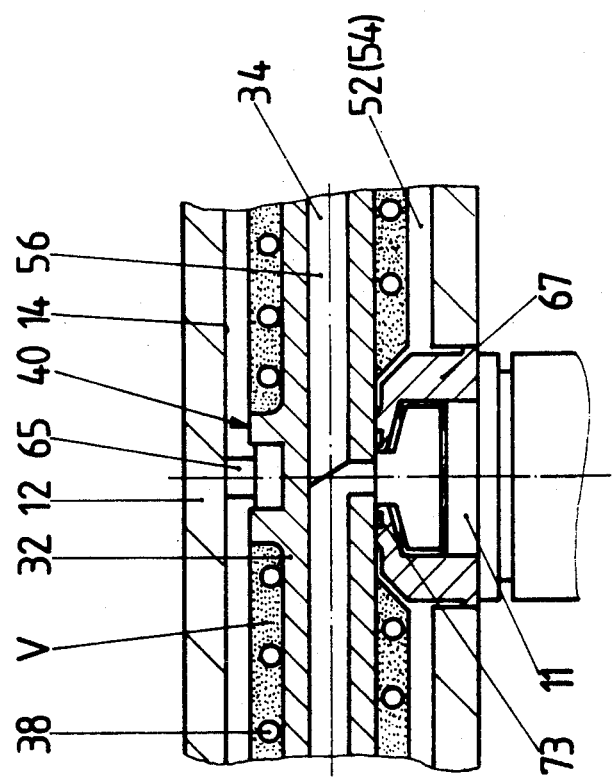

FIG. 3 is a transverse sectional view of a core member of the runner along lines III—III of FIG. 1, FIG. 4 is an axial sectional view of a cross-type runner, FIG. 5 is a schematic diagram of a hot runner system, FIG. 6 is an axial sectional view of a modified hot runner, FIG. 7 is a transverse sectional view of the runner of FIG. 6, along lines VII—VII therein, FIG. 8 is a transverse sectional view along lines VIII—VIII of FIG. 6, FIG. 9 is an axial sectional view of yet another runner embodiment, FIG. 10 is a transverse sectional view of the runner of FIG. 9, along lines X—X therein, FIG. 11 is transverse sectional view along lines XI—XI of FIG. 9, FIG. 12 is a partial axial section of another hot runner portion, FIG. 13 is a cross-sectional view corresponding to lines XIII—XIII of FIG. 12 including axially offset components, FIG. 14 a partial axial section of a further hot runner portion, FIG. 15 is a cross-sectional view of yet another embodiment and FIG. 16 is a top view of a hot runner nozzle for use with hot runners as shown in FIGS. 14 and 15.

The runner shown in FIG. 1 is designated by 10. It includes a casing 12 having a bore 14 into which a cartridge-like unit 16 is fitted. At either end, abutting members 18 serve to axially close the unit 16 within casing 12.

The cartridge or unit 16 comprises a sleeve body 20 composed of a plurality of sleeve section. In the embodiment drawn, there is a central section 21 continued by intermediate sections 24, transition sections 22 and end portions 23 on either side. The respective neighboring sections have joining gaps 25 with overlaps 26 so as to permit thermal expansion or shrinking as the temperatures ranging in the respective areas undergo changes. In addition, each pair of overlaps 26 forms a self-closing seal.

The sleeve body 20 has outer peripheral ribs 50 which snugly fit the bore 14 and are very narrow so as to minimize the heat transfer towards the casing 12. For enhancing the thermal insulation between the unit 16 and the casing 12, there are outer spaces or cavities 52 between the peripheral ribs 50. Since these latter are tightly fitted to the bore 14, the spaces 52 will normally be free of any plastics material processed. However, if under unfavorable conditions any material should enter hollow or space 52 after all, the processing pressure will force the neighboring outer overlap 26 onto the associated inner overlap. This will preclude any inflow of plastics material into a clearance 54 that generally forms an annular chamber and serves to thermally separate the outer sleeve body 20 from an inner core member 30. The latter is supported by a flow tube 32 which may bear an electric insulation (not shown, as it may be very thin) and a heating coil 38 which is embedded in, and bonded to, a thermoconductive compound mass V that may contain aluminium.

Flow passages 35,36 of the flow tube 32, which includes a main runner 34, are opposite to tubular recesses of the sleeve body 20. The plastics material processed enters via an admission opening 35, passes through the main runner 34 and leaves it via two or more outlets 36. The directions of the flow are designated by M in FIG. 1.

Figure 2:
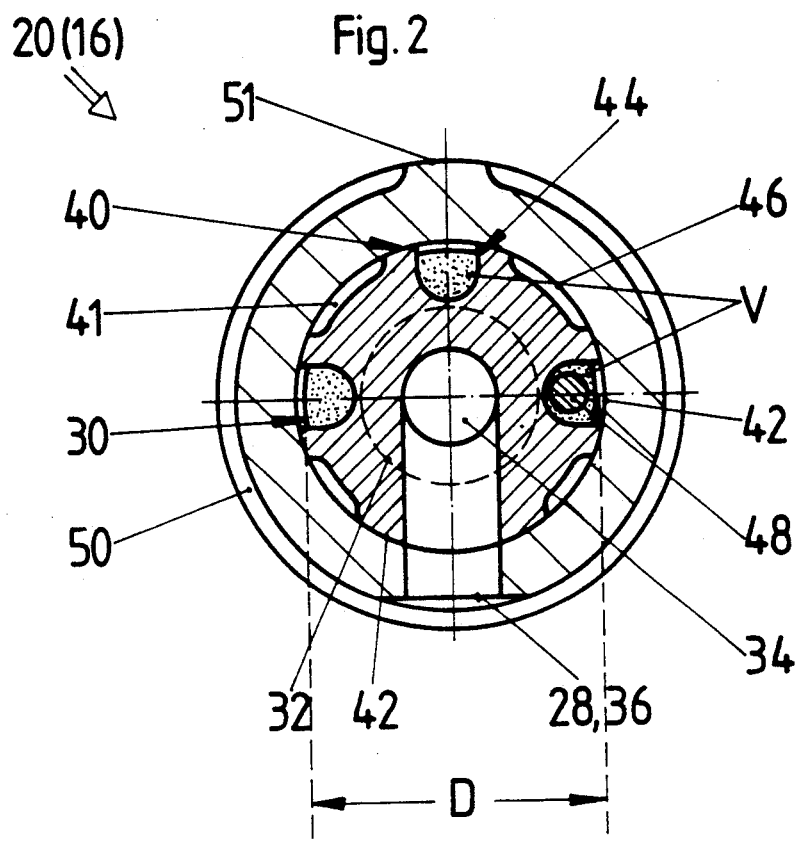
FIG. 2 is transverse sectional view of the runner along lines II—II of FIG. 1.

In the regions of the flow passages 35,36, the sleeve body 20 is secured to the core member 30 by means of broad radial props or collar-type supports 40 of the flow tube 32 (see FIGS. 2 and 3). Parallel to the latter's axis, outer channels 44 on the core member 30 serve to receive longitudinal portions 48 of the heating coil 38. The channels 44 are also overcast with the sealing compound V so as to form highly thermoconductive bridges between the various portions of the heating means.

Once the heating coil 38 as well as the outer channels 44 have been compound-filled, the sleeve body 20 is shrunk onto the core member 30. A central position of each of the individual sleeve sections 21. 22. 23 24 will then tightly fit an associated collar-type support 40 of the flow tube 32. Thus the hot runner channel passages are continued by direct form-fit to the respective tubular recesses 28 opposite which each sleeve section comprises a supporting segment 51 in order to receive reaction forces originating as the plastics material M flows in or out, respectively, under operational pressure.

Each collar-type support 40 has outer ribs 42 at axial distances to one another to that ring pockets 41 are in between, well distributed over the main portion of the periphery. This design contributes much towards saving of energy since merely the narrow ribs 42 and the supporting areas 40/46 may draw off heat from the interior and dissipate it outwards.

The exterior of unit 16 includes the isolating spaces already mentioned by way of thermoinsulating annular chambers 54 that provide clearances between the core member 30 and the various sections 21 to 24 of the sleeve body 20. In an axial direction, the annular chambers 54 are continous except for partial interruptions in the regions of the respective collar-type supports 40 and central portions 46.

The main runner 34 of the hot runner system 10 is axially closed, near the outlets 36, by deflecting plugs 56. One of them (the righthand one in FIG. 1) may hold a thermosensor 60 supported in a plug 58 of the associated abutting member 18. The coil connections may be arranged in the vicinity as is shown by connector 62 to the compound-filled heating coil 38.

At either end, the annular chambers 54 may be continued by axial spaces 64 that are empty in order to warrant optimum heat insulation. The sleeve body 20 is supported at either end in the axial abutting members 18 which also define face-side spaces 52 in an axial direction A.

An important feature is the sturdy structure of high thermal resistance, as evident from the enlarged transverse sectional view of FIG. 2 combined with FIG. 3. The core member 30 made up of the flow tube 32 and the heating coil 38 is of an outer diameter D which is exceeded slightly at the core member ends and at each collar-type support 40 only, so that the compound-overcast heating coil 38 is safely held and the core member 30 can be easily introduced into the sleeve body 20 to be attached thereto. As the individual sections of the sleeve body 20 are shrunk on, the radially projecting areas of the collar-type supports 40 and of its ribs 42 are tightly engaged. Consequently the unit 16 forms an extremely stable composite cartridge.

Such cartridge units permit the realization of variegated hot runner embodiments. An example of application is shown in FIG. 4 wherein pairs of units 16 aligned to each other in two parallel vertical bores 14 are crosswise intersected by transverse units from above and from below. Using a total of five identical units 16, an H-configuration is created whose main runners 34 are all flow-connected. Namely, the face-side ends of the pairs of vertically aligned units 16 are not plugged but connected in that the various main runners 34 issue directly, via a tubular recess 28 each, into the outer flow passages of the horizontal cartridge unit 16. Only the latter is axially closed by a plug 56 (righthand in FIG. 4).

Securing pins 66 serve to fix the vertical units 16 in the casing 12, i.e. in the hot runner carrier plate. Thus the horizontal position of the transverse unit 16 is determined whose abutting members 18 also safeguard the axial positioning. The sleeve end portions 23, which are shrunk onto a shoulder of the end sections of flow tube 32 and which engage the collar-type supports 40 of the transverse unit 16 via intermediate sections 24, serve to support the vertical units 16 facewise so that the reaction forces caused during the injection of plastics are reliably and evenly distributed.

The invention is not restricted to the embodiments described. For example, the outer channels 44 at the collar-type supports 40 may be slanted or inclined. If twisted or spirally wound, they may be pitch-adapted to the heating coil turns.

In a compact space-saving design, the flow tube 32 may be embodied by a double tube or a multi-tube in that adjacent to the main runner 34, there is a transverse passage at the respective outlet location leading to a parallel runner (not shown) which in turn comprises two outlets, resulting in a total of four flow passages 36 Using a further parallel runner which is flow-connected to the outlets and which can also be easily accommodated within the cross sectional area of the flow tube 32, the number of flow passages 36 can be redoubled, as is shown schematically in FIG. 5, if without regard to the physical tube arrangement. It will be realized that in a particular embodiment, each subsequent runner may be arranged at a right angle to the foregoing one rather than parallel thereto, whereby a compact crisscross block array is formed. An important feature is that identical flow paths exist towards all passages or outlets 36 so that the pressure drop will be equal at all the outlet locations safeguarding uniform product quality of the molded articles.

It will be understood that dimensional changes caused by thermal expansion and by shrinking due to cooling in the various operational phases cannot influence the function of the hot runner 10 according to the invention which distinguishes over the prior art by providing identical heat transition at all flow passages and, at the same time, producing most uniform temperature profiles. Narrow supporting areas and sealed cavities or empty spaces warrant excellent heat insulation so that the temperature of the runner casing 12 is preferably about equal to that of the mold, e.g. about 80° C. (degrees centigrade), whereas the material processed in the flow tube 32 may be as hot as 300° C. Such large temperature differences or gradients give rise to dimensional changes which, however, do not affect the cartridge unit 16. Its core member 30 is securely held in casing bore so that optimum service is achieved even under severe conditions of high temperatures and pressures. Like portions of the electric heating means 38 can be accomodated at either side of admission opening of the flow tube that need to be clamped at its ends. A 220 volts mains supply is particularly well suited, but the structure can also be modified for low-voltage operation, e.g. using a 24 volts or 5 volts supply.

Another embodiment of a hot runner system 10 shown in FIGS. 6 to 8 comprises a simplified cartridge 16 that does without a sleeve body 20. Here, the flow tube 32 is integral with solid tube studs acting as flow passages 35, 36 and having preferably plane faces 40 for direct form-fit to other hot runner components, in particular a machine nozzle adapter (partly indicated on top of FIG. 6) at the admission opening 35 and hot runner nozzles 11 at the outlets 36 (partly indicated in FIG. 6, bottom). Radial supports include again supporting segments 51 opposite the respective flow passages 36; opposite the admission opening 35, FIG. 6 shows a stud engaged by a securing bolt 37 that prevents any turning or shifting of the cartridge 16 within the casing bore 14.

The cross sectional views of FIGS. 7 and 8 show very narrow radial supports 49, 51 resulting in minimum bearing areas at the bore 14. Expediently halfway between the flow passages 35 and 36, respectively, the radial supports 49 are shaped as spiders or stars having three spokes 50 each (FIG. 8). Longitudinal portions 48 of the heating coil 38, to be operated preferably with a 220 volts supply, are likewise embedded in the compound mass V of the core member 30.

In a generally similar structure shown in FIGS. 9 to 11, the cartridge 16 comprises heating means 38 by way of rods to be operated with low voltage, e.g. 24 volts or 5 volts. An electrical insulation layer 39 may be provided at the outside of flow tube 32 and/or at each of the heating rods which are overcast with the thermoconductive compound mass V to form the core member 30. The connectors 62 may be secured in a terminal ring 19 through which the plug 56 holding thermosensor 60 is fed. It will be noted that the radial supports 49 may each comprise four spokes 50 (FIG. 11) although other spider configurations with different numbers of spokes are feasible as well.

The embodiment shown in FIGS. 12 and 13 shows a cartridge 16 whose core member 30 comprises a sturdy flow tube 32 closed (lefthand in FIG. 12) by a deflecting plug 56 that engages a stop-like shoulder 57. In the regions of the flow passages, e.g. of outlets 36, the wall thickness of the flow tube 32 is reduced so as to form flats 40 directly engaged by the form-fitting top of the associated hot runner nozzle 11. A setscrew 69 serves to lock the flow tube 32 in its axial and radial position. The radial supports for the flow tube 32 are studs 68 which may be short tubes (FIG. 13, top) and are preferably grouped such that two pairs of studs 68 are arranged at either side of the nozzle 11 while a fifth stud 68 supports the flow tube region opposite the outlet 36. As a special feature, it will be noted that the radial supports 68, 69 are thermally insulated by air gaps or insulating rings 74, e. g. of ceramics, which surround the studs 68, 69 in the thermoconductive compound mass V so that the thermal conduction paths are longer. Specifically, the studs 68, 69 may be made of low-conduction material such as nickel chromium steel in order to further reduce heat dissipation from the interior.

Yet another embodiment as shown in FIGS. 14 and 15 comprises a rivet-shaped radial support 65 that is engaged between the bore 14 and the flow tube 32 which includes a receiving collar-type 40 opposite the outlet 36. The latter is directly form-fitted to the top of the associated hot runner nozzle 11 which is surrounded by an air-gap insulated adapter bush 67. By means of fixing bolts 70 screwed into tapped holes 71 of the adapter bush 67 (FIG. 16), the nozzle 11 is accurately held in its snug-fit position engaging the outlet face. It will be evident from FIGS. 14 and 16 that the top of the hot runner nozzle 11 or the adapter bush 67 may comprise a sloping face 72 permitting close packing of adjacent nozzles arranged at right angles for applications where a multiple array is desired. An annular groove 73 may receive a ring seal (not shown), e. g. of metal, for tight sealing of the matching faces 40/11.

While preferred embodiments have been illustrated and explained hereinabove, it should be understood that numerous variations and modifications will be apparent to one skilled in the art without departing from the principles of the invention which, therefore, is not to be construed as being limited to the specific forms described.

I claim:

1. A hot runner system for the injection molding of plastics which comprises in combination
   (a) a casing (12) with at least one interior bore (14), and
   (b) a cartridge (16) mounted within each said interior bore (14), each cartridge comprising
      (1) a solid core member (30) having flow passages for the flow of plastic,
      (2) an insulated and overcast flow tube (32) positioned within said bore (14) and having interior flow passages (34, 35, 36) for the flow of plastic through the tube and having an electric insulation layer surrounding said flow tube (32),
      (3) electrical heating means (38) disposed around the exterior of said flow tube (32) and bonded thereto by an overcast mass of thermoconductive materials (V),
      (4) a plurality of spaced apart radially outwardly extending supports (40, 49, 50, 51) on said solid core member (30) which abut the interior of said bore (14) so as to provide a plurality of spaces (52, 54) between the interior of the bore (14) and the exterior of said solid core (30), and
      (5) radial supports (40, 69) including hollows or recesses (41, 44) for minimum heat transfer at the bearing areas in the bore (14) and collar-type supports (40) comprising sealing faces arranged inside the bore (14) without contact thereto.

2. A hot runner system according to claim 1 wherein the cartridge (16) and the flow tube (32) proper comprise a plurality of axially spaced radial supports (40) which project radially over the outer diameter (D) of the core member (30) for close fit inside the basing bore (14), the radial supports (40) of the flow tube (32) located at the flow passages (35, 36) being shaped for the direct sealing engagement of hot runner components that include hot runner nozzle (11) and additional cartridges (16) or flow tubes (32).

3. A hot runner system according to claim 1 wherein radial supports (51) extending parallel to an axial direction (A) are arranged opposite collar-type supports (40) for the transmission of large flow reaction forces.

4. A hot runner system according to claim 1 wherein collar-type supports (40) of the flow tube (32) include outer channels (44) for receiving longitudinal portions (48) of the heating means (38), the outer channels (44) extending parallel or slanted to an axial direction (A).

5. A hot runner system according to claim 1 wherein the radial supports (40, 49, 69) of the cartridge (16) are thermally insulated from their thermoconductive portions, and especially from the compound mass (V).

6. A hot runner system according to claim 1, wherein collar-type supports (40) of the flow tube (32) comprise ring pockets (41) axially interspaced between outer ribs (42).

7. A hot runner system according to claim 1, wherein the radial supports (40, 49) include a hub portion (53) rigidly connected with the flow tube (32) and include a plurality of axially spaced narrow spiders (49) shaped as stars having at least three spokes (50).

8. A hot runner system according to claim 1, wherein each cartridge (16) includes outer peripheral ribs (50) snug-fitted in the casing bore (14) so as to separate outer hollow compartments (52) spaced in an axial direction (A).

9. A hot runner system according to claim 1, wherein the flow tube (32) is encompassed by a sleeve body (20) composed of a plurality of sections (21 to 24) each of which is radially secured near the flow passages (35, 36) to a collar-type support (40) of the flow tube (32).

10. A hot runner system according to claim 9 wherein each sleeve body section (21 to 24) includes a radially recessed central portion (46) joined onto an associated collar-type support (40) for tight engagement to its sealing face.

11. A hot runner system according to claim 9 wherein the sleeve sections (21 to 24) are interconnected by overlaps (26) at joining gaps (25) that are sealed against the flow of plastics by peripheral ribs (50).

12. A hot runner system according to claim 9 wherein the ends of the sleeve sections (21 to 24) overlap in an axial direction (A) at the joining gaps (25) so that operational pressure acting in outer hollow spaces (52) between the peripheral ribs (50) renders the overlaps (26) self-closing.

13. A hot runner system according to claim 9 wherein an outer supporting segment (51) is arranged diametrically opposite each of the flow passages (35, 36).

14. A hot runner system according to claim 9 wherein between the core member (30) and the sleeve body (20), there are insulating spaces in the form of inner clearances or annular chambers (54) separated from each other in an axial direction (A) by radial support elements (40, 46; 42; 51) so as to remain free of plastics.

15. A hot runner system according to claim 14 wherein at least one annular chamber (54) at the ends of the core member (30) extends axially into an empty space (64).

16. A hot runner system according to claim 9 wherein the ends of the sleeve body (20) are positively fitted to abutting members (18) which axially seal the runner casing (12).

17. A hot runner system according to claim 1, including an admission opening provided radially at the center of one cartridge (16) and at least one axial admission opening provided at a face end of further cartridges (16), wherein an H-shaped or cross-type runner is formed by at least two cartridge units (16) inserted into casing bores (14) at an angle to each other such that a face end of a flow tube (32) sealingly engages a tubular recess (28) of a sleeve section (21 or 22) provided with a collar-type support (40) whereby each outlet (36) of a foregoing runner (34) will be sealingly joined by an admission opening (35) of a subsequent runner (34).

18. A hot runner system according to claim 17 wherein intersecting cartridge units (16) are fixed inside the casing (12) by securing pins (66) and wherein the flow tubes (32) are facewise supported relative to each transverse cartridge (16).

19. A hot runner system according to claim 18 wherein the flow tubes (32) are facewise supported relative to each transverse cartridge (16) by means of end portions of shrunk sections (21 to 24).

* * * * *